(12) United States Patent
Schroeder et al.

(10) Patent No.: US 6,477,843 B2
(45) Date of Patent: Nov. 12, 2002

(54) VENTILATION FOR AN ENCLOSURE OF A GAS TURBINE AND RELATED METHOD

(75) Inventors: Troy Joseph Schroeder, Mauldin, SC (US); David Leach, Simpsonville, SC (US); Michael Anthony O'Toole, Greenfield Center, NY (US)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 09/983,662

(22) Filed: Oct. 25, 2001

(65) Prior Publication Data

US 2002/0023426 A1 Feb. 28, 2002

Related U.S. Application Data

(62) Division of application No. 09/621,876, filed on Jul. 21, 2001, now Pat. No. 6,357,221.

(51) Int. Cl.[7] ................................................ F02C 7/12
(52) U.S. Cl. ...................................................... 60/772
(58) Field of Search .......................... 60/772, 782, 796, 60/801; 123/41.7

(56) References Cited

U.S. PATENT DOCUMENTS

| | | | | |
|---|---|---|---|---|
| 3,418,485 A | * | 12/1968 | Anderson | 290/1 |
| 3,462,949 A | * | 8/1969 | Anderson | 60/39.31 |
| 3,791,682 A | * | 2/1974 | Mitchell | 290/2 |
| 5,649,418 A | * | 7/1997 | Ludwig | 60/39.33 |
| 6,082,094 A | * | 7/2000 | Longardner | 60/39.33 |
| 6,134,878 A | * | 10/2000 | Amako | 60/39.33 |
| 2001/0003242 A1 | * | 6/2001 | Takamatsu | 60/39.33 |

OTHER PUBLICATIONS

"39th Turbine State–of–the–Art Technology Seminar", Tab 1, "F" Technology—the First Half–Million Operating Hours, H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA—An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.

(List continued on next page.)

*Primary Examiner*—Ehud Gartenberg
(74) *Attorney, Agent, or Firm*—Nixon & Vanderhye P.C.

(57) ABSTRACT

A ventilation scheme for a rotary machine supported on pedestals within an enclosure having a roof, end walls and side walls with the machine arranged parallel to the side walls, includes ventilation air inlets located in a first end wall of the enclosure; a barrier wall located within the enclosure, proximate the first end wall to thereby create a plenum chamber. The barrier wall is constructed to provide a substantially annular gap between the barrier wall and a casing of the turbine to thereby direct ventilation air axially along the turbine; one or more ventilation air outlets located proximate a second, opposite end wall on the roof of the enclosure. In addition, one or more fans are provided for pulling ventilating air into said plenum chamber via the ventilation air inlets.

4 Claims, 2 Drawing Sheets

OTHER PUBLICATIONS

"39th GE Turbine State–of–the–Art Technology Seminar", Tab 6, "GE Aeroderivative Gas Turbines—Design and Operating Features", M.W. Horner, Aug. 1996.

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines,"J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1995.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, Vol. 2—Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H. Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–of–the–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4. e "General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology" Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H" Gas Turbine Combined Cycles", Thomas C. Paul et al., Report.

"Power–Gen '96 of Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3–13, Oct. 1995.

"Proceedings of the Advanced Turbine Systems Annual Program Review Meeting", vol. I, "H Gas Turbine Combined Cycle", J. Corman, p. 14–21, Oct., 1995.

"Proceedings of the Advanced Turbine Systems Annual Program Review Meeting", vol. I, "Overview of Westinghouse's Advanced Turbine Systems Program", Bannister et al., p. 22–30, Oct., 1995.

"Proceedings of the Advanced Turbine Systems Annual Program Review Meeting", vol. I, "Allison Engine ATS Program Technical Review", D. Mukavetz, p. 31–42, Oct., 1995.

"Proceedings of the Advanced Turbine Systems Annual Program Review Meeting", vol. I, "Advanced Turbine Systems Program, Industrial System Concept Development", S. Gates, p. 43–63, Oct., 1995.

"Proceedings of the Advanced Turbine Systems Annual Program Review Meeting", vol. I, "Advanced Turbine System Program Phase 2 Cycle Selection", Latcovich, Jr., p. 64–69, Oct., 1995.

"Proceedings of the Advanced Turbine Systems Annual Program Review Meeting", vol. I, "General Electric ATS Program Technical Review Phase 2 Activities", Chance et al., p. 70–74, Oct., 1995.

"Proceedings of the Advanced Turbine Systems Annual Program Review Meeting", vol. I, "Technical Review of Westinghouse's Advanced Turbine Systems Program", Diakunchak et al., p. 75–86, Oct., 1995.

"Proceedings of the Advanced Turbine Systems Annual Program Review Meeting", vol. I, "Advanced Combustion Turbines and Cycles: An EPRI Perspective", Touchton et al., p. 87–88, Oct., 1995.

"Proceedings of the Advanced Turbine Systems Annual Program Review Meeting", vol. I, "Advanced Turbine Systems Annual Program Review", William E. Koop, p. 89–92, Oct., 1995.

"Proceedings of the Advanced Turbine Systems Annual Program Review Meeting", vol. I, "The AGTSR Consortium: An Update", Fant et al., p. 93–102, Oct., 1995.

"Proceedings of the Advanced Turbine Systems Annual Program Review Meeting", vol. I, "Overview of Allison/AGTSR Interactions", Sy A. Ali, p. 103–106, Oct., 1995.

"Proceedings of the Advanced Turbine Systems Annual Program Review Meeting", vol. I, "Design Factors for Stable Lean Premix Combustion", Richards et al., p. 107–113, Oct., 1995.

"Proceedings of the Advanced Turbine Systems Annual Program Review Meeting", vol. I, "Ceramic Stationary as Turbine", M. van Roode, p. 114–147, Oct., 1995.

"Proceedings of the Advanced Turbine Systems Annual Program Review Meeting", vol. I, "DOE/Allison Ceramic Vane Effort", Wenglarz et al., p. 148–151, Oct., 1995.

"Proceedings of the Advanced Turbine Systems Annual Program Review Meeting", vol. I, "Materials/Manufacturing Element of the Advanced Turbine Systems Program", Karnitz et al., p. 152–160, Oct., 1995.

"Proceedings of the Advanced Turbine Systems Annual Program Review Meeting", vol. I, "Land–Based Turbine Casting Initiative", Mueller et al., p. 161–170, Oct., 1995.

"Proceedings of the Advanced Turbine Systems Annual Program Review Meeting", vol. I, "Turbine Airfoil Manufacturing Technology", Kortovich, p. 171–181, Oct., 1995.

"Proceedings of the Advanced Turbine Systems Annual Program Review Meeting", vol I, "Pratt & Whitney Thermal Barrier Coatings", Bornstein et al., p. 182–193, Oct., 1995.

"Proceedings of the Advanced Turbine Systems Annual Program Review Meeting", vol. I, "Westinhouse Thermal Barrier Coatings", Goedjen et al., p. 194–199, Oct., 1995.

"Proceedings of the Advanced Turbine Systems Annual Program Review Meeting", vol. I, "High Performance Steam Development", Duffy et al., p. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., p. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. p. 233–248, Oct., 1995.

"Proceedings of the Advanced Turbine Systems Annual Program Review Meeting", vol. II, "Lean Premixed Flames for Low $No_x$ Combustors", Sojka et al., p. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., p. 281–309, Oct., 1995.

"Proceedings of the Advanced Turbine Systems Annual Program Review Meeting", vol. II, "Life Prediction of Advanced Materials for Gas Turbine Application", Zamrik et al., p. 310–327, Oct., 1995.

"Proceedings of the Advanced Turbine Systems Annual Program Review Meeting", vol. II, "Advanced Combustion Technologies for Gas Turbine Power Plants", Vandsburger et al., p. 328–352, Oct., 1995.

"Proceedings of the Advanced Turbine Systems Annual Program Review Meeting", vol. II, "Combustion Modeling in Advanced Gas Turbine Systems", Smoot et al., p. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371–390, Oct., 1995.

"Proceedings of the Advanced Turbine Systems Annual Program Review Meeting", vol. II, "Rotational Effects on Turbine Blade Cooling", Govatzidakia et al., p. 391–392, Oct., 1995.

"Proceedings of the Advanced Turbine Systems Annual Program Review Meeting", vol. II, "Manifold Methods for Methane Combustion", Yang et al., p. 393–409, Oct., 1995.

"Proceedings of the Advanced Turbine Systems Annual Program Review Meeting", vol. II, "Advanced Multistage Turbine Glade Aerodynamics, Performance, Cooling and Heat Transfer", Fleeter et al., p. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., p. 415–422, Oct., 1995.

"Proceedings of the Advanced Turbine Systems Annual Program Review Meeting", vol. II, "Experimental and Computational Studies of Film Cooling With Compound Angle Injection", Goldstein et al., p. 423–451, Oct., 1995.

"Proceedings of the Advanced Turbine Systems Annual Program Review Meeting", vol. II, "Compatibility of Gas Turbine Materials with Steam Cooling", Desai et al., p. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465–473, Oct., 1995.

"Proceedings of the Advance Turbine Systems Annual Program Review Meeting", vol. II, Effects of Geometry on Slot–Jet Film Cooling Performance, Hyams et al., p. 474–496, Oct, 1995.

"Proceedings of the Advanced Turbine Systems Annual Program Review Meeting", vol. II, "Steam as Turbine Blade Coolant: Experimental Data Generation", Wilmsen et al., p. 497–505, Oct., 1995.

"Proceedings of the Advanced Turbine Systems Annual Program Review Meeting", vol. II, "Combustion Chemical Vapor Deposited Coatings for Thermal Coating Systems", Hampikian et al., p. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., p. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., p. 529–538, Oct., 1995.

"Proceedings of the Advanced Turbine Systems Annual Program Review Meeting", vol. II, "Bond Strength and Stress Measurements in Thermal Barrier Coatings", Gell et al., p. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., p. 550–551, Oct., 1995.

"Proceedings of the Advanced Turbine Systems Annual Program Review Meeting", vol. II, "Combustion Instability Modeling and Analysis", Santoro et al., p. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560–565, Oct., 1995.

"Proceedings of the Advanced Turbine Systems Annual Program Review Meeting", vol. II, "Heat Pipe Turbine Vane Cooling", Langston et al., p. 566–572, Oct., 1995.

"Proceedings of the Advanced Turbine Systems Annual Program Review Meeting", vol. II, "Improved Modeling Techniques for Turbomachinery Flow Fields", Lakshminarayana et al., p. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, p. 3–16, Nov., 1996.

"Proceedings of the Advanced Turbine Systems Annual Program Review Meeting", "Power Needs in the Chemical Industry", Keith Davidson, p. 17–26, Nov., 1996.

"Proceedings of the Advanced Turbine Systems Annual Program Review Meeting", "Advanced Turbine Systems Program Overview", David Esbeck, p. 27–34, Nov., 1996.

"Proceedings of the Advanced Turbine Systems Annual Program Review Meeting", "Westinghouse's Advance Turbine Systems Program", Gerard McQuiggan, p. 35–48, Nov., 1996.

"Proceedings of the Advanced Turbine Systems Annual Program Review Meeting", "Overview of GE's H Gas Turbine Combined Cycle", Cook et al., p. 29–72, Nov., 1996.

"Proceedings of the Advanced Turbine Systems Annual Program Review Meeting", "Allison Advanced Simple Cycle Gas Turbine System", William D. Weisbrod, p. 73–94, Nov., 1996.

"Proceedings of the Advanced Turbine Systems Annual Program Review Meeting", "The AGTSR Industry–University Consortium", Lawrence P. Golan, p. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, p. 111–112, Nov., 1996.

"Proceedings of the Advanced Turbine Systems Annual Program Review Meeting", "Methodologies for Active Mixing and Combustion Control", URI Vandsburger, p. 123–156, Nov., 1996.

"Proceedings of the Advanced Turbine Systems Annual Program Review Meeting", "Combustion Modeling in Advanced Gas Turbine Systems", Paul O. Hedman, p. 157–160, Nov., 19967.

"Proceedings of the Advanced Turbine Systems Annual Program Review Meeting", "Manifold Methods for Methane Combustion", Stephen B. Pope, p. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, p. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, p. 211–232, Nov., 1996.

"Proceedings of the Advanced Turbine Systems Annual Program Review Meeting", "Combustion Instability Studies Application to Land–Based Gas Turbine Combustors", Robert J. Santoro, p. 233–252.

"Proceedings of the Advanced Turbine Systems Annual Program Review Meeting", Active Control of Combustion Instabilities in Low $NO_x$ Turbines, Ben T. Zinn, p. 253–264, Nov., 1996.

"Proceedings of the Advanced Turbine Systems Annual Program Review Meeting", "Life Prediction of Advanced Materials for Gas Turbine Application," Sam Y. Zamrik, p. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, p. 275–290, Nov., 1996.

"Proceedings of the Advanced Turbine Systems Annual Program Review Meeting", "Compatibility of Gas Turbine Materials with Steam Cooling", Vimal Desai, p. 291–314, Nov., 1996.

"Proceedings of the Advanced Turbine Systems Annual Program Review Meeting", "Bond Strength and Stress Measurements in Thermal Barrier Coatings", Maurice Gell, p. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335–356, Nov., 1996.

"Proceedings of the Advanced Turbine Systems Annual Program Review Meeting", "Flow Characteristics of an Intercooler System for Power Generating Gas Turbines", Ajay K. Agrawal, p. 357–370, Nov., 1996.

"Proceedings of the Advanced Turbine Systems Annual Program Review Meeting", "Improved Modeling Techniques for Turbomachinery Flow Fields", B. Lakshiminarayana, p. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393–406, Nov., 1996.

"Proceedings of the Advanced Turbine Systems Annual Program Review Meeting", "Advanced Turbine Cooling, Heat Transfer, and Aerodynamic Studies", Je–Chin Han, p. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427–446.

"Proceedings of the Advanced Turbine Systems Annual Program Review Meeting", "Experimental and Computational Studies of Film Cooling with Compound Angle Injection", R. Goldstein, p. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461–470, Nov., 1996.

"Proceedings of the Advanced Turbine Systems Annual Program Review Meeting", "Steam Blade Coolant: External Side Heat Transfer", Abraham Engeda, p. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483–498, Nov., 1996.

"Proceedings of the Advanced Turbine Systems Annual Program Review Meeting", "Closed–Loop Mist/Steam Cooling for Advanced Turbine Systems", Ting Wang, p. 499–512, Nov., 1996.

"Proceedings of the Advanced Turbine Systems Annual Program Review Meeting", "Heat Pipe Turbine Vane Cooling", Langston et al., p. 513–534, Nov., 1996.

"Proceedings of the Advanced Turbine Systems Annual Program Review Meeting", "EPRI's Combustion Turbine Program: Status and Future Directions", Arthur Cohn, p. 535,–552 Nov., 1996.

"Proceedings of the Advanced Turbine Systems Annual Program Review Meeting", "ATS Materials Support", Michael Karnitz, p. 553–576, Nov., 1996.

"Proceedings of the Advanced Turbine Systems Annual Program Review Meeting", "Land Based Turbine Casting Initiative", Boyd A. Mueller, p. 577–592, Nov., 1996.

"Proceedings of the Advanced Turbine Systems Annual Program Review Meeting", "Turbine Airfoil Manufacturing Technology", charles S. Kortovich, p. 593–622, Nov. 1996.

"Proceedings of the Advanced Turbine Systems Annual Program Review Meeting", "Hot Corrosion Testing of TBS's", Norman Bernstein, p. 623–631, Nov., 1996.

"Proceedings of the Advanced Turbine Systems Annual Program Review Meeting", "Ceramic Stationary Gas Turbine", Mark van Roode, p. 633–658, Nov., 1996.

"Proceedings of the Advanced Turbine Systems Annual Program Review Meeting", "Western European Status of Ceramics for Gas Turbines", Tibor Bornemisza, p. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's Gas Turbine—High Efficiency, Low Cost of Electricity and Low Emissions", Roger Schonewald and Patrick Marolda, (No date available).

"Testing Program Results Validate GE's Gas Turbine—High Efficiency, Low Cost of Electricity and Low Emissions", Slide Presentation—working draft, (No date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos. DOE/MC–31176—5628.

"Utility Advanced Turbine System (ATS) Technology Readiness Testing—Phase 3", Document #666274, Oct. 1, 1996–Sep. 30, 1997, Publication Date, Dec. 31, 1997, Report Nos. DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos. DOE/MC/31176—5340.

"Utility Advanced Turbine System (ATS) Technology Readiness Testing and Pre–Commercial Demonstration—Phase 3", Document #486132, Apr. 1–Jun. 30, 1976, Publication Date, Dec. 31, 1996, Report Nos. DOE/MC/31176—5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos. DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos. DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos. DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos. DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May 1, 1999, Report Nos. DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176—18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos. DOE/MC/31176–07.

"Proceedings of the 1997 Advanced Turbine Systems", Annual Program Review Meeting, Oct. 28–29, 1997.

* cited by examiner

VENTILATION FOR AN ENCLOSURE OF A GAS TURBINE AND RELATED METHOD

This application claims is a division of application Ser. No. 09/621,876, filed Jul. 21, 2001, now U.S. Pat. No. 6,357,221 the entire content of which is hereby incorporate by reference in this application.

This invention relates to power plant construction and, specifically, to a ventilation scheme for a gas turbine enclosure.

BACKGROUND OF THE INVENTION

A significant contributor to the increase of net simple and combined cycle efficiencies for large industrial gas turbines is the ability to achieve tighter rotor/stator tip clearances. An important factor in the ability to control and maintain clearances is the ability to control the shape of the turbine casing. Circumferential thermal variations in the casing temperature can lead to shape distortions and thereby negatively impact efficiencies.

Large industrial gas turbines using advanced technologies to achieve higher simple cycle and combined cycle efficiencies are sensitive to local environment conditions. Ventilation of the enclosure or compartment in which the turbine is located is required in order to remove excess heat, and to minimize by dilution the buildup of hazardous gases in the enclosure. However, for large industrial gas turbines, several practical barriers arise: the amount of heat to be removed; the size of the compartment to be ventilated with its complexity of hardware and possible stagnate flow zones; and, the buoyancy dominated natural convection that may result in thermal gradients in casing surface temperature. The historical ventilation methodology results in a thermal profile of the turbine casings that adversely affects shape, and therefore clearances (or rubs), and thus also net simple and combined cycle efficiencies.

Two approaches have been used to achieve the requirements of heat removal and hazardous gas dilution. One is ventilation using a "chimney" concept and the other is the use of insulation.

The chimney concept employs inlets placed low he turbine enclosure or compartment walls, outlets on the enclosure roof, and a blower fan also on the roof of the enclosure (or, if the enclosure is located within a larger building, then on the roof of the building). The enclosure and ducting is negatively pressurized to minimize the area which must be classified as "hazardous" due to the presence of potentially hazardous gas leak sources. With the general flow pattern transverse to the axis of the turbine, and hence the turbine casing, the result is essentially a tube-in-cross flow arrangement where air comes in at the bottom of the enclosure, passes substantially vertically over the horizontally oriented turbine casing and exits the top of the enclosure. Along with a natural convection plume from the machine, a cold casing bottom and hot casing top is likely to result. This temperature profile results in a thermal distortion due to length along the top of the casing growing more than that of the bottom. On the occasion when dilution ventilation is also a concern, additional inlets are added to try and control the temperature gradients, but in many instances, the additional inlets resulted in impingement cooling of certain portions of the casing, also creating an adverse thermal effect.

The use of insulation is prevalent among many producers of large industrial gas turbines. Insulation has the advantage of minimizing the amount of heat rejected to the enclosure, and reducing the thermal sensitivity of the casing to local environment conditions. However, the large industrial gas turbines aimed at achieving higher efficiencies also utilize higher firing temperatures and higher pressure ratios. Both of these result in higher internal temperatures. Thus, special insulation materials must be used that are often more expensive, assuming they are even available. In some instances, the addition of insulation requires in casing flange bolts to be made of higher grade materials. Bolts made of this higher-grade material typically result in a cost increase that may be several times the additional cost of an axial ventilation system.

BRIEF SUMMARY OF THE INVENTION

An "axial" ventilation system has been developed to provide better control of the ventilation air over the gas turbine casing within an enclosure to thereby minimize losses due to thermal variations. The "axial" flow concept has been developed to create a uniform flow along and around the casing, minimizing temperature variations. Because of the sweeping action inherent with the axial concept, dilution ventilation capabilities are also improved.

In order to create an axial flow over the turbine casing, an internal barrier wall is placed near the ventilation air inlet end of the enclosure. A plenum area or chamber is thus created between the enclosure wall and the internal barrier wall. It is in this area that inlet openings or louvers are located. From the plenum chamber, the ventilation air passes through an annular gap between the turbine casing and the barrier wall, causing the ventilation air to flow over the turbine in an axial direction. The pressure drop across the plenum inlet contributes to the uniformity of flow through the annular gap, while the increased velocity at the axial gap contributes to the effective length of impact of the axial flow. The momentum of this axial flow overcomes the otherwise dominant buoyancy effect, at least along that part of the turbine considered critical. Outlets are located in the roof, on the opposite end of the enclosure, from which the ventilation air is pulled by fans.

The arrangement of the turbine within the enclosure is such that it sits on two tall, concrete pedestals via bearings that are secured to opposite sides of the casing. Two horizontally directed inlets on opposite sides of the enclosure, downstream of the barrier wall, ventilate the area between the concrete pedestals, one inlet on each side of the enclosure. These inlets are slightly offset in the axial direction to induce mixing, and are located such that their flow does not impinge directly on the turbine casing. This lower volume of ventilating air eventually rises and is carried out of the enclosure with the larger volume of axially flowing air.

Other ventilation openings may be strategically located in the internal barrier wall so as to reduce or eliminate any stagnant or recirculation zones within the enclosure that would otherwise negatively impact dilution ventilation capability. With this arrangement, there is essentially a continuous sweep of the enclosure with ventilation air.

An additional feature of the ventilation system (which may have applicability in certain power plant layouts) pertains to personnel safety and relates to the manner in which persons may enter or exit the enclosure when the ventilation fans are running. Because of the amount of flow and the pressure losses of the flow through the various components, there is approximately 1 inch of water vacuum in the enclosure. With this level of vacuum, the force required to open a door may not be overcome by all individuals. Because of this, doors are provided through the internal barrier wall and through the enclosure aft of the barrier wall. While this feature is highly desirable for axial flow ventilation, it's use does not have to be exclusive to such a concept. Another feature that has also been developed with this ventilation concept, but which is not exclusive to this arrangement, is the use of louvered doors.

In its broader aspects, therefore, the invention relates to a ventilation scheme for a turbine supported on pedestals within an enclosure having a roof, end walls and side walls with the turbine arranged parallel to the side walls, the ventilation scheme comprising ventilation air inlets located in a first end wall of the enclosure; a barrier wall located within the enclosure, proximate the first end wall to thereby create a plenum chamber, the barrier wall constructed to provide an annular gap between the barrier wall and a casing of the turbine to thereby direct ventilation air axially along the turbine; one or more ventilation air outlets located proximate a second, opposite end wall; and one or more fans for pulling ventilating air into the plenum chamber via the ventilation air inlets.

In another aspect, the invention relates to a combined cycle power plant comprising a gas turbine, a steam turbine and at least one generator, the gas turbine supported on axially spaced pedestals within the enclosure; ventilation air inlets located in a first end wall of the enclosure; a barrier wall located within the enclosure, proximate the first end wall to thereby create a plenum chamber, the barrier wall constructed to provide an annular gap between the barrier wall and a casing wall of the gas turbine to thereby direct ventilation air axially along the gas turbine; one or more ventilation air outlets located proximate a second, opposite end wall; and one or more fans for supplying ventilating air to the plenum chamber via the ventilation air inlets.

In still another aspect, the invention relates to a method of ventilating an enclosure having a roof, a pair of side walls and a pair of end walls, and wherein a gas turbine casing is supported on a plurality of pedestals in the enclosure such that a rotor of the turbine extends substantially parallel to said side walls, the method comprising:

a) establishing a plenum chamber adjacent one of the end walls;

b) pulling ventilation air into the plenum chamber;

c) causing the ventilation air to flow axially along at least as portion of the casing; and d) removing the ventilation air proximate said other of said end walls.

DETAILED DESCRIPTION OF THE INVENTION

Figure 1:
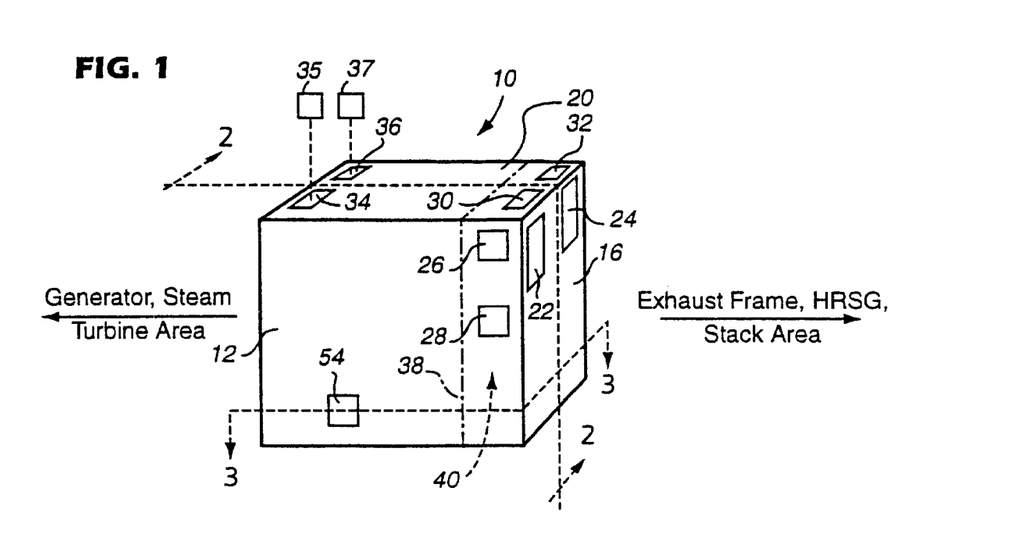
FIG. 1 is a simplified schematic perspective view of a turbine enclosure in accordance with the invention.

FIG. 1 illustrates in simplified schematic form an enclosure 10 that encloses a rotary machine such as a gas turbine. The enclosure may or may not be located in a larger building. The enclosure 10 has a pair of side walls 12, 14; a pair of end walls 16, 18 and a roof 20. The enclosure is typically rectangular in shape (the drawing figures are not to scale), with the side walls extending parallel to the longitudinal axis (the axis of rotation or the turbine rotor) of the gas turbine.

End wall 16 for purposes of this discussion is regarded as the inlet end of the enclosure, and is provided with inlet openings or louvers 22, 24 in an upper region of the end wall. Additional inlets or louvers 26, 28 are provided in side wall 12 adjacent the end wall 16 (similar inlets are provided in side wall 14 but are not visible in the drawings). Inlet openings or louvers 30, 32 may be provided in the roof 20, also adjacent the end wall 16. Outlet openings 34, 36 are located in the roof 20, at the outlet end of the enclosure, adjacent end wall 18.

A barrier wall 38 is located interiorly of the enclosure, extending parallel to the end wall 16 in the inlet end region of the enclosure. This arrangement creates a plenum chamber 40, with ventilating air introduced into the plenum chamber through all of the inlet openings or louvers mentioned above. The barrier wall 38 is formed with an opening surrounding a portion of the casing 42 of the gas turbine 44, creating a roughly annular air gap 46, best seen in FIG. 2.

Figure 2:
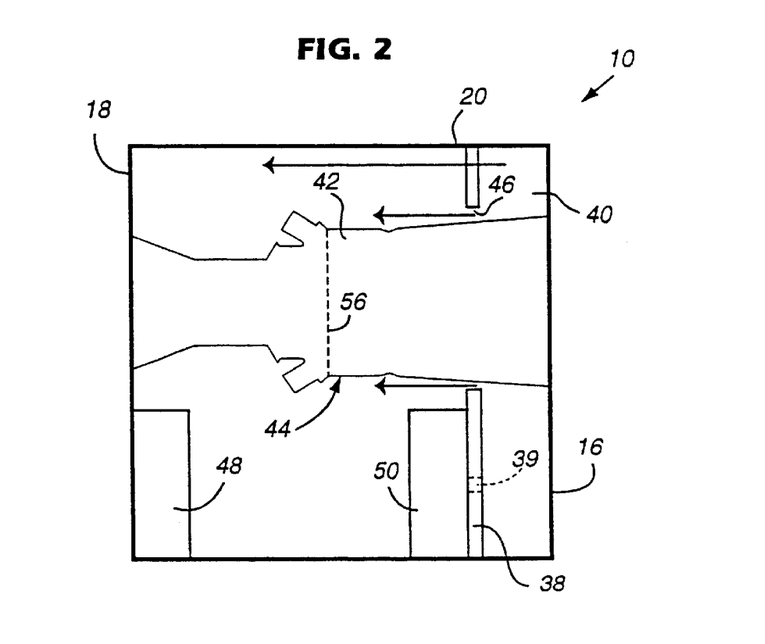
FIG. 2 is a section of the enclosure shown in FIG. 1, taken along the line 2—2.

The gas turbine casing 42 is supported by bearings (not shown) that are, in turn, mounted on concrete pedestals 48, 50. With the bearings connected to opposite sides of the casing 42, it will be appreciated that the gap 44 extends substantially 360° about the casing, and that a large axial and circumferential portion of the entire casing is exposed to ventilating air.

Figure 3:
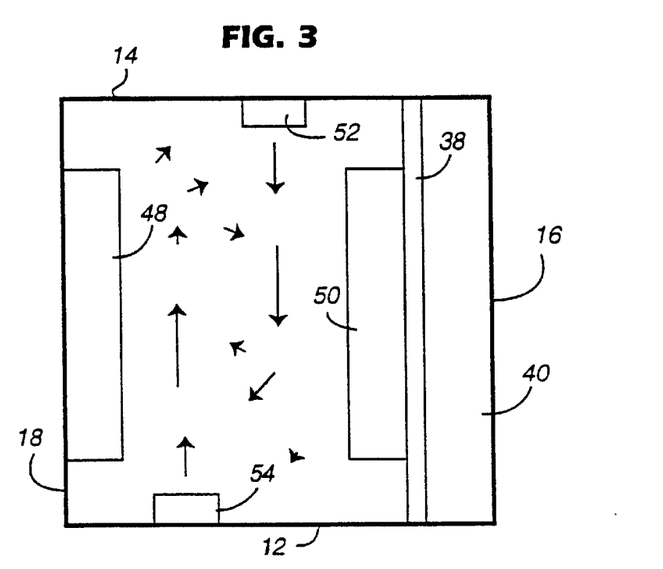
FIG. 3 is a section of the enclosure shown in FIG. 1, taken along the line 3—3.

With particular reference to FIGS. 1 and 3, additional inlet openings or louvers 52, 54 are located in the side walls 12, 14 in the middle portion of the enclosure, downstream of the barrier wall 38. These inlets are located at lower elevation so as to supply ventilating air into the enclosure in areas below the turbine casing 42 and axially between the pedestals 48, 50.

Fans 35, 37 are located proximate the outlets 34, 36 on the roof 20 if the enclosure 10 is outdoors. If the enclosure is in a larger building, the fans are located outside the building and ducts extend between the fans and the enclosure outlets 34, 36.

When the fans are turned on, ventilation air will be drawn into the plenum chamber 40 via the inlet openings or louvers 22, 24, 26, 28, 30 and 32. The ventilating air will accelerate as it passes through the roughly annular gap 44, creating an axial momentum that will drive the ventilation air axially along the casing 42, at least to a location indicated by dotted line 56, corresponding to the approximate point of fuel injection into the gas turbine combustion chamber. (In this regard, note that the flow of ventilating air is opposite the internal turbine flow.) This is the most critical part of the turbine casing for purposes of addressing thermal gradients in the casing. As the axial momentum of the ventilating air dissipates, the natural buoyancy effect will eventually take over as the air is drawn upwardly to the outlets 34, 36 at the downstream end of the enclosure. At the same time, lesser quantities of ventilating air are drawn into the inlet openings or louvers 52, 54 in the side walls 12, 14, creating a transverse flow as best seen in FIG. 3. By axially offsetting the inlet openings or louvers 52, 54, good mixing of the ventilating air is achieved below the turbine and in the areas of the pedestals 48, 50. This transversely introduced ventilation air is eventually drawn upwardly to mix with the main ventilating flow and to the outlets 34, 36. If necessary, additional openings (one shown by dotted line 39) may be provided on the barrier wall that are strategically located to thereby reduce or eliminate any stagnant or recirculation zones within the enclosure that would otherwise negatively impact the dilution ventilation capability.

Figure 4:
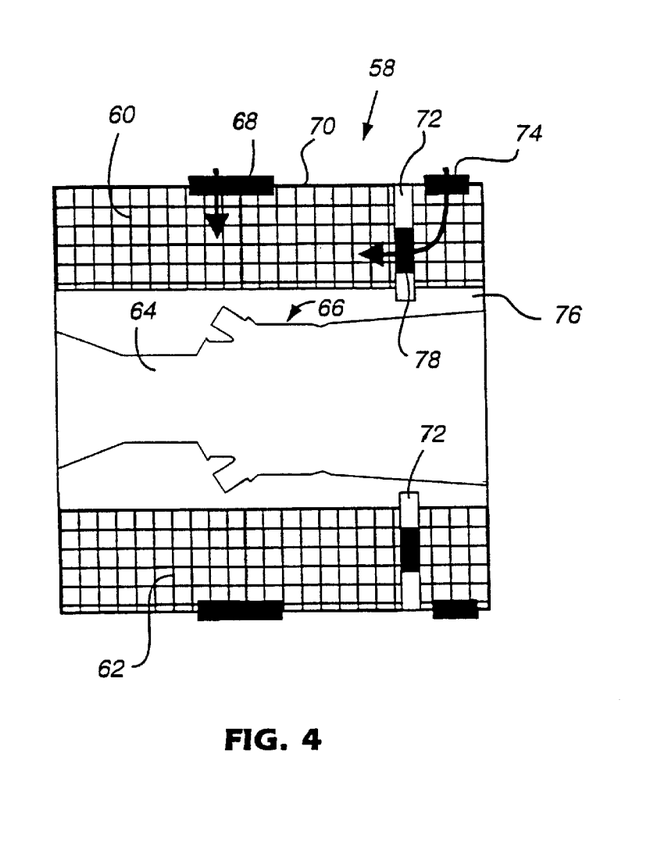
FIG. 4 is a schematic plan view of an enclosure in accordance with a variation of the invention.

Turning now to FIG. 4, an optional feature is illustrated that has applicability in certain power plant layouts. Within an enclosure 58 (shown in plan view), grated service floors 60, 62 are shown on either side of the casing 64 of a turbine 66, such floors typically located approximately at the mid-height level of the turbine. It will be appreciated that utilization of grated floors will not impede the flow of ventilation air through the enclosure. A personnel service door 68 is typically located within the enclosure side wall 70 (downstream of the barrier wall 72 of this invention). This door, if solid, will interfere with the ventilating air if opened while the fans are on, and can also result in the ventilating air directly impinging on the turbine casing 64. In accordance with the invention, an alternative service door 74 is located in the side wall 70, upstream of the barrier wall 72, within the plenum chamber 76. A third door 78 is located in the barrier wall 72 itself, opening from the plenum chamber 76 into the main enclosure area. The doors 74 and 78 are easier to open than door 68 when the fans are on, and opening either door 74 or 78 will not redirect any ventilating air downstream of the barrier wall 72. Thus, it is preferred that door 68 be used only when the fans are off, and that doors 74 and 78 be used when the fans are on.

As already mentioned herein, the inlet openings may be in the form of louvers (preferably adjustable). It should be appreciated that the service doors 74, 78 may also be louvered, minimizing the amount of flow blockage when a door is open, thus also minimizing the disturbance to the pressure loss (and thereby flow rate) profile of the ventilation flow.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of ventilating an enclosure having a roof, a pair of side walls and a pair of end walls, and wherein a gas turbine is supported on a plurality of pedestals in the enclosure such that a rotor of the turbine extends substantially parallel to said side walls, the method comprising:

a) establishing a plenum chamber adjacent one of said end walls;

wherein the plenum chamber is defined in part by an internal barrier wall surrounding the turbine, with an annular ventilation air gap between a casing of the turbine and the barrier wall;

b) pulling ventilation air into the plenum chamber;

c) causing the ventilation air to flow axially along at least a portion of the turbine; and d) removing the ventilation air at a location proximate said other of said end walls.

2. The method of claim 1 and including the step of flowing additional ventilation air in a transverse direction below the turbine and between the pedestals.

3. The method of claim 1 wherein step c) is carried out such that ventilation air flows in a direction opposite to that of gaseous flow within the turbine.

4. The method of claim 1 wherein, in step c), the ventilation air has axial momentum sufficient to cause the ventilation to flow axially along said turbine at least to a location aft of the gas turbine combustion chamber.

* * * * *

UNITED STATES PATENT AND TRADEMARK OFFICE
CERTIFICATE OF CORRECTION

PATENT NO. : 6,477,843 B2  Page 1 of 1
DATED : November 12, 2002
INVENTOR(S) : Schroeder et al.

It is certified that error appears in the above-identified patent and that said Letters Patent is hereby corrected as shown below:

Column 1,
Line 4, delete "claims".
Line 5, delete "Jul. 21, 2001," and insert -- July 21, 2001 --.

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.        : 6,477,843 B2                                              Page 1 of 1
APPLICATION NO. : 09/983662
DATED             : November 12, 2002
INVENTOR(S)       : Schroeder et al.

It is certified that error appears in the above-identified patent and that said Letters Patent is hereby corrected as shown below:

Column 1, line 3, below the title, insert:

--The Government of the United States of America has rights in this invention pursuant to Contract No. DE-FC21-95MC31176 awarded by the U.S. Department of Energy.--

Signed and Sealed this

Twentieth Day of February, 2007

JON W. DUDAS
*Director of the United States Patent and Trademark Office*